US008760304B2

(12) United States Patent
Pincu

(10) Patent No.: US 8,760,304 B2
(45) Date of Patent: Jun. 24, 2014

(54) SECURITY BARRIER WITH EMERGENCY RELEASE MECHANISM

(76) Inventor: Max Samuel Pincu, Dallas, TX (US)

( * ) Notice: Subject to any disclaimer, the term of this patent is extended or adjusted under 35 U.S.C. 154(b) by 187 days.

(21) Appl. No.: 13/207,754

(22) Filed: Aug. 11, 2011

(65) Prior Publication Data

US 2013/0038423 A1 Feb. 14, 2013

(51) Int. Cl.

| | |
|---|---|
| ***G06F 7/04*** | (2006.01) |
| ***G05B 19/00*** | (2006.01) |
| ***G08B 13/08*** | (2006.01) |
| ***G08B 17/10*** | (2006.01) |
| ***E05F 15/00*** | (2006.01) |

(52) U.S. Cl.
USPC ........ 340/632; 340/5.64; 340/545.1; 340/5.7; 49/280

(58) Field of Classification Search
USPC .................. 340/632, 5.64, 545.1, 5.7; 49/280
See application file for complete search history.

(56) References Cited

U.S. PATENT DOCUMENTS 3,963,097 A * 6/1976 Fisher ............................ 182/76
6,680,669 B1 * 1/2004 Terry ........................... 340/5.64
2004/0257200 A1 * 12/2004 Baumgardner et al. ...... 340/5.72
2005/0078003 A1 * 4/2005 King ............................ 340/506
2006/0000946 A1 * 1/2006 Garofani et al. ........... 244/118.5
2006/0130404 A1 * 6/2006 Lilly ............................... 49/280
2007/0194922 A1 * 8/2007 Nathan et al. .............. 340/572.1
2007/0284188 A1 * 12/2007 Chippindale .................. 182/48
2008/0061948 A1 * 3/2008 Perez ....................... 340/310.11
2008/0106368 A1 * 5/2008 Vitier ............................ 340/5.5
2009/0322473 A1 * 12/2009 Aliferis et al. ................. 340/5.7
2011/0254685 A1 * 10/2011 Karasek et al. ............... 340/540
2012/0012423 A1 * 1/2012 Murphy .......................... 182/96

* cited by examiner

*Primary Examiner* — George Bugg
*Assistant Examiner* — Munear Akki
(74) *Attorney, Agent, or Firm* — Baker Botts L.L.P.

(57) ABSTRACT

In certain embodiments, a system includes a security barrier attached to a structure such that the security barrier is operable to move from a first position, in which the security barrier blocks an exterior opening of the structure, to a second position, in which the security barrier does not block the exterior opening of the structure. The system further includes a latch mechanism operable to control movement of the security barrier from the first position to the second position and a sensor operable to generate an emergency signal indicating an emergency condition within the structure. The system further includes a control unit operable to access the emergency signal generated by the sensor and generate, in response to the emergency signal, a release signal to be communicated to the latch mechanism. The release signal is operable to cause the latch mechanism to permit the security barrier to move from the first position to the second position.

19 Claims, 2 Drawing Sheets

SECURITY BARRIER WITH EMERGENCY RELEASE MECHANISM

TECHNICAL FIELD

This invention relates generally to security barriers and more particularly to security barriers with an emergency release mechanism.

BACKGROUND OF THE INVENTION

A security barrier is an apparatus attached to a structure operable to block an external opening to prevent unauthorized entry into the structure. A security barrier may block a doorway, window, vent, skylight, or other exterior opening of a structure.

SUMMARY OF THE INVENTION

According to embodiments of the present disclosure, disadvantages and problems associated with previous security barrier systems may be reduced or eliminated.

In certain embodiments, a system includes a security barrier attached to a structure such that the security barrier is operable to move from a first position, in which the security barrier blocks an exterior opening of the structure, to a second position, in which the security barrier does not block the exterior opening of the structure. The system further includes a latch mechanism operable to control movement of the security barrier from the first position to the second position, and a sensor operable to generate an emergency signal indicating an emergency condition within the structure. The system further includes a control unit operable to access the emergency signal generated by the sensor and to generate, in response to the emergency signal, a release signal to be communicated to the latch mechanism. The release signal is operable to cause the latch mechanism to permit the security barrier to move from the first position to the second position.

Certain embodiments of the present disclosure may provide one or more technical advantages. A technical advantage of the present disclosure is that the control unit may communicate with latch mechanism and one or more emergency sensors, allowing the control unit to generate a release signal based on one or more emergency conditions, such as the presence of smoke, fire, or dangerous gases. Additionally, particular embodiments provide an automated system for moving a security barrier, in response to an emergency signal, from a first position, which blocks an exterior opening of a structure, to a second position, which does not block the exterior opening. In certain embodiments, the security barrier in the first position may provide security for occupants by preventing unauthorized persons from entering the structure and, in event of an emergency, the security barrier in the second position may allow occupants to exit the structure, or allow persons, such as emergency personnel, to enter the structure. Yet another technical advantage is that the control unit may connect to an exit indicator and, in response to an emergency signal from a sensor, may signal the exit indicator to indicate to occupants the location of an exterior opening of the structure. Still yet another technical advantage is that, in response to a failure of a primary power supply, the system may receive electricity from a backup power supply that provides electrical power to one or more components of the system, such as the latch mechanism, the control unit, and one or more sensors.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
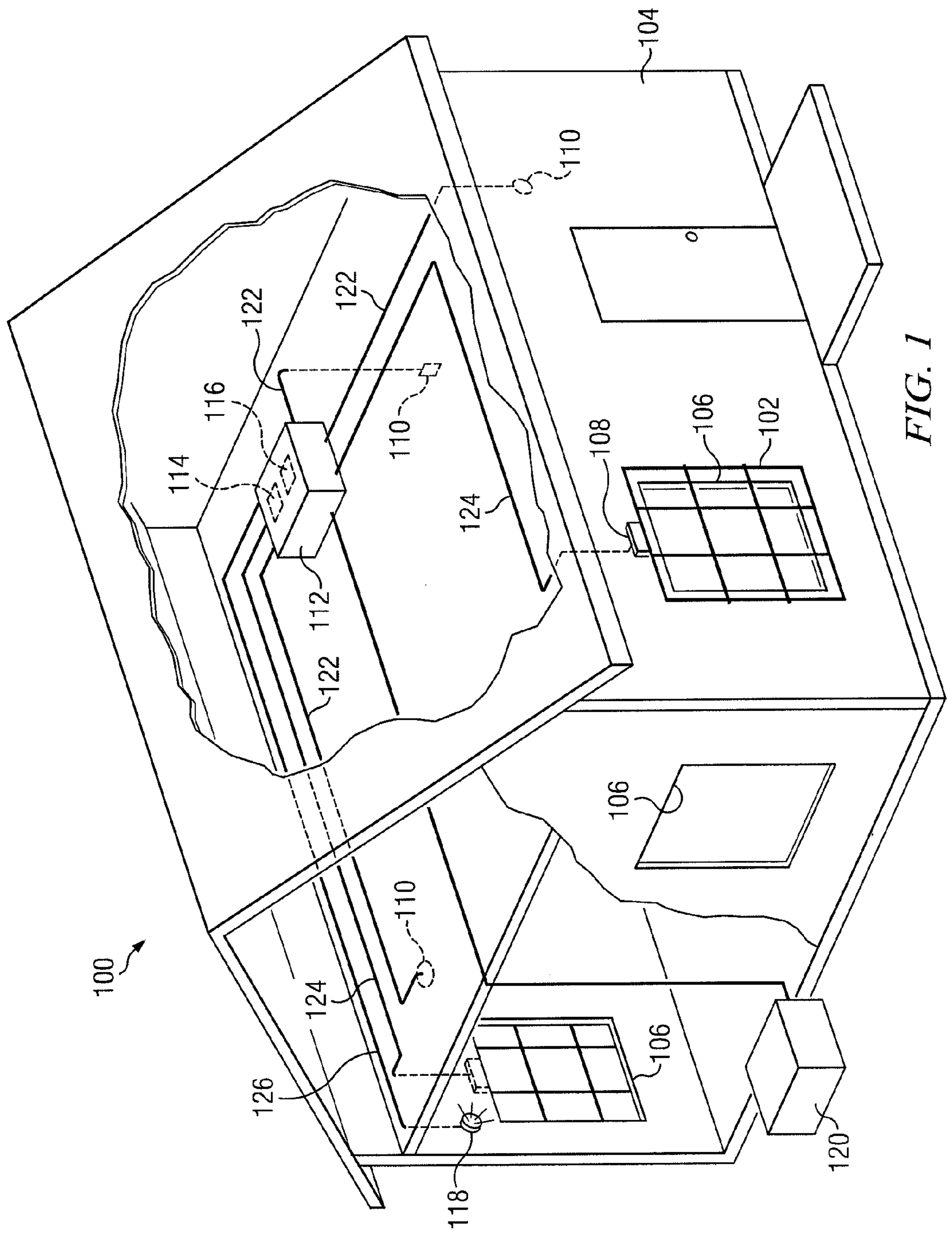
FIG. 1 illustrates an example system for a security barrier with emergency release mechanism according to certain embodiments of the present disclosure.

FIG. 1 illustrates an example system 100 comprising security barrier 102 attached to structure 104 for blocking exterior opening 106 of structure 104, according to certain embodiments of the present disclosure. System 100 includes a security barrier 102 coupled to structure 104 such that the security barrier 102 blocks an exterior opening 106 of structure 104 when in a first position and does not block the exterior opening 106 of structure 104 when in a second position. System 100 further includes a one or more latch mechanisms 108 operable to control the movement of one or more security barriers 102 from the first position to the second position, one or more sensors 110 operable to detect emergency conditions within structure 106 and to generate emergency signals 122, and a control unit 112 operable to generate a release signal 124 to be communicated to latch mechanism 108 in response to the emergency signals 122 generated by one or more sensors 110.

As described in further detail below, control unit 112 may access emergency signals 122 indicating an emergency condition within structure 104 generated by one or more sensors 110 and, in response, communicate a release signal 124 to one or more latch mechanisms 106. In response to a release signal 124, latch mechanism 108 may allow security barrier 102 to move from the first position (in which security barrier 102 blocks exterior opening 106 to prevent unauthorized entry of structure 104) to the second position (in which security barrier 102 does not block exterior opening 106 such that occupants of structure 104 may exit through exterior opening 106 and/or emergency personnel may enter structure 104 through exterior opening 106). As a result, system 100 may prevent unauthorized entry of structure 104 while allowing occupants of the structure 104 to safely exit in the event of an emergency. Although a particular implementation of system 100 is illustrated and primarily described, the present disclosure contemplates any suitable implementation of system 100, according to particular needs.

Structure 104 may include all or a portion of a structure operable to house occupants (e.g., persons, pets, or any other suitable occupants). For example, structure 104 may include a house, an apartment, an office building, a warehouse, a recreational vehicle, a stadium, an aircraft, a boat, or any other suitable construction for housing occupants. Structure 104 may include one or more exterior openings 106 (e.g., windows, doors, vents, skylights, or any other passage between the interior and the exterior of structure 104).

Security barrier 102 may be any suitable apparatus operable to prevent passage through an exterior opening 106 of a structure 104. For example, security barrier 102 may comprise one or more of bars, panels, doors, window panes, shutters, screens, or other covering for an exterior opening 106 of a structure 104. Security barrier 102 may be comprised of one or more of any suitable material such as metal, alloy, wood, glass, plastic, fiberglass, composite materials, or any other suitable material. In certain embodiments, security barrier 102 may be coupled to structure 104 (e.g., using nails, glue, screws, brackets, welds, staples, or any other suitable fasteners) such that security barrier 102 may move from a first position (in which security barrier 102 blocks exterior opening 106) to a second position (in which security barrier 102 does not block exterior opening 106).

Latch mechanisms 108 may be any suitable mechanism operable to control the movement of security barrier 102 from the first position to the second position (e.g., in response to a release signal 124 from control unit 112, as described below). For example, latch mechanisms 108 may include one or more of hinges, clasps, fasteners, rails, switches, magnets, actuators, motors, or any other suitable component or device operable to either (1) maintain security barrier 102 in the first position, or (2) cause/allow security barrier to move to the second position. For example, latch mechanism 108 may comprise a mechanism operable to secure a security barrier 102 in the first position and, when released, allow the security barrier 102 to move by sliding, hinging, falling, being pulled by a counterweight, or other method to the second position (e.g., an electromagnet, an actuator, releasable fastener, or other suitable mechanism). As another example, latch mechanism 108 may comprise a mechanism operable to secure a security barrier 102 in the first position and, when released, move security barrier 102 to the second position (e.g., an actuator, an engine, an electromagnet, or other suitable mechanism).

The one or more sensors 110 may each include any suitable device operable to generate an emergency signal 122 indicating an emergency condition within structure 104. For example, a sensor 110 may include any suitable device operable to detect heat, smoke, gas, radiation, unauthorized entry to a structure 104, or any other suitable emergency condition. In certain embodiments, a sensor 110 may additionally or alternatively include a switch (e.g. a panic button) that may be activated by an occupant of the structure 104 in response to detection by the occupant of an emergency condition. The one or more sensors 110 may each additionally be operable to generate an emergency signal 122 in response to the above-described detection of an emergency condition. The generated emergency signal 122 may then be communicated to a control unit 112, as described in further detail below.

In certain embodiments, one or more components of system 100 (e.g. latch mechanisms 108, sensors 110, or any other suitable component) may be configured to communicate (via wireless or wireline communication) with a control unit 112. Control unit 112 may include one or more computer systems at one or more locations. Each computer system may include any appropriate input devices (such as a keypad, touch screen, mouse, or other device that to receive information), output devices, mass storage media, or other suitable components for receiving, processing, storing, and communicating data. Both the input devices and output devices may include fixed or removable storage media such as a magnetic computer disk, CD-ROM, or other suitable media to both receive input from, and provide output to, a user. Each computer system may include a personal computer, workstation, network computer, kiosk, wireless data port, personal data assistant (PDA), one or more processors within these or other devices, or any other suitable processing device. Control unit 112 may include any suitable combination of software, firmware, and hardware.

Control unit 112 may additionally include one or more processing modules 114. Processing modules 114 may each include one or more microprocessors, controllers, or any other suitable computing devices or resources and may work, either alone or with other components to provide a portion or all of the functionality described herein. Control unit 112 may additionally include (or be communicatively coupled to via wireless or wireline communication) memory 116. Memory 116 may include any memory or database module and may take the form of volatile or non-volatile memory, including, without limitation, magnetic media, optical media, random access memory (RAM), read-only memory (ROM), removable media, or any other suitable local or remote memory component. In certain embodiments, control units 112 are each associated with particular security barriers 102 and are located local to the associated security barrier 102, such as within the same room as the associated security barrier or with in a particular distance (e.g., 10 ft) of the associated security barrier.

In certain embodiments, control unit 112 is operable to access an emergency signal 122 generated by one or more sensors 110 and, in response to the emergency signal 122, generate a release signal 124 to be communicated to one or more latch mechanism 108. In certain embodiments, control until 112 may signal each of the one or more latch mechanisms 108 concurrently. In certain other embodiments, control until 112 may signal a single latch mechanism 108 individually, for example, a latch mechanism 108 associated with (or located closest to) a sensor 110 that generated the emergency signal 122. Although control unit 112 is depicted and primarily described as a stand-alone component of system 100, the present disclosure contemplates that control unit 112 may be integrated with one or more other components of system 100 (e.g., sensors 110, latch mechanisms 108, or any other suitable component of system 100).

In certain embodiments, system 100 additionally includes one or more exit indicators 118. Exit indicators 118 represent any device operable to indicate (e.g., audio and/or visual indication) the location of exterior opening 106 to occupants of structure 104. Exit indicators 118 may be operable to receive an activation signal 126 and, in response to the activation signal, indicate the location of an exterior opening 106. For example, exit indicator 118 may include one or more of visual indicators (e.g. lights, strobes, path lighting, illuminated signs, etc), audio indicators (e.g. speakers, bells, sirens, chimes), and/or any other suitable indicator. In an embodiment, exit indicators 118 receive an activation signal 126 from control unit 112. In another embodiment, exit indicators 118 receive an activation signal 126 from one or more sensors 110.

In certain embodiments, system 100 includes one or more backup power supplies 120. Backup power supply 120 represents a device operable to provide secondary electrical power to one or more components of system 100 (e.g. latch mechanism 108, control unit 112, sensor 110, exit indicator 118, or other component) in the event of a failure to a primary electrical supply. Backup power supply 120 may include one or more of batteries, generators, dynamos, or other source of electricity. Backup power supply 120 may further be operable to detect failure of a primary power supply and to automatically provide electricity to one or more components of system 100. In certain embodiments, backup power supplies 120 are each associated with particular security barriers 102 and are located local to the associated security barrier 102, such as within the same room as the associated security barrier or with in a particular distance (e.g., 10 ft) of the associated security barrier.

In certain embodiments, system 100 includes other components such as ventilation devices operable to remove harmful gas (e.g., fans, ducts, vents, etc), glass breaking devices operable to clear glass from exterior openings 106, exit apparatus operable to assist occupants safely exiting structure 104 (e.g., slides, ladders, ropes, etc.), and/or fire suppression devices operable to suppress or extinguish fires (e.g., fire extinguisher or sprinkler system) that are communicatively coupled to control unit 112. Control unit 112 may be communicatively coupled to components of system 100 in any suitable fashion. In certain embodiments, existing infrastructure of a structure 104 may be used to communicatively connect control unit 112 to components of system 100 (e.g., telephone lines, electrical wires, pipe, or other conductive medium found in a structure 104).

In an embodiment, control unit 112 identifies the location and/or type of emergency condition, for example, based on the location and/or type of sensor 110 emitting an emergency signal 122 (e.g., fire alarm, carbon monoxide detector, panic switch). Control unit 112 may respond differently depending on the location and/or type of emergency condition. For example, if the control unit 112 detects that a fire exists on the second floor, the control unit may only release latches of security barriers, activate ventilation devices, fire suppression devices, glass breaking devices, and/or exist apparatus on the second floor. Control unit 112 may respond to the location and/or type of emergency condition by activating any combination of components communicatively coupled to control unit 112.

In an embodiment, if control unit 112 cannot communicate with one or more components of system 100, control unit 112 may release latches 108 associated with security barriers located near the component. For example, if control unit 112 loses communication with a sensor 110 (e.g., the sensor 110 malfunctioned, lost power, and/or a communication channel is severed), then control unit 112 may release the latch 108 associated with the security barrier 102 located closest to the sensor 110. In an embodiment, control unit 112 may emit a signal indicating that it has lost communication with a component.

Although a particular implementation of system 100 is illustrated and primarily described, the present disclosure contemplates any suitable implementation of system 100, according to particular needs. Moreover, although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

Figure 2:
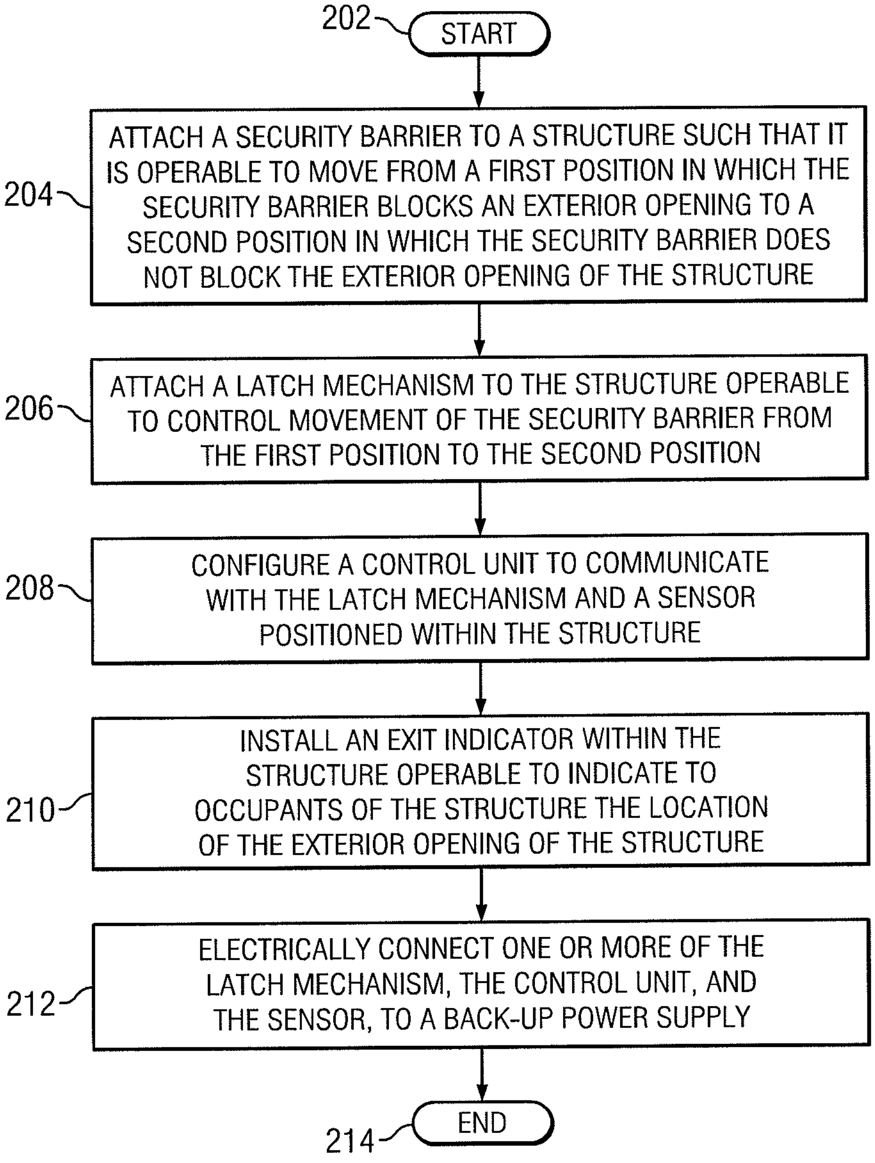
FIG. 2 illustrates an example method for installing a security barrier with emergency release mechanism, according to certain embodiments of the present disclosure.

FIG. 2 illustrates an example method 200 for installing a security barrier with an emergency release latch mechanism, according to certain embodiments of the present disclosure. The method begins at step 202. At step 204, security barrier 102 is attached to structure 104 such that it is operable to move from a first position, in which security barrier 102 blocks exterior opening 106, to a second position, in which security barrier 102 does not block exterior opening 106 of the structure 104.

At step 206, latch mechanism 108 is attached to structure 104, latch mechanism 108 operable to control movement of security barrier 102 from the first position to the second position. In an embodiment, latch mechanism 108 may be hingeably attached to the exterior of structure 104. In another embodiment, latch mechanism may be slidably attached to the exterior of structure 104.

At step 208, control unit 112 is configured to communicate with latch mechanism 108 and sensor 110 positioned within the structure, control unit 112 operable to access an emergency signal 122 generated by sensor 110 indicating an emergency condition within the structure and to generate, in response to the emergency signal 122, a release signal 124 to be communicated to latch mechanism 108 operable to cause latch mechanism 108 to permit security barrier 102 to move from the first position to the second position. In certain embodiments, sensor 110 comprises one or more of a smoke detector and a carbon monoxide detector.

At step 210, exit indicator 118 is installed within structure 110, exit indicator 118 operable to indicate to occupants of structure 104 the location of exterior opening 106. At step 230, backup power supply 120 is electrically connected to one or more of latch mechanism 108, control unit 112, sensor 110, exit indicator 118 or other component of system 100, and is operable to: detect a failure of a primary power supply and to provide, in response to detecting the failure of the primary power supply, electrical power to one or more of latch mechanism 108, control unit 112, sensor 110, exit indicator 118, or other component of system 100. The installation of a security barrier with emergency release is completed at step 214.

Although the steps of method 200 have been described as being performed in a particular order, the present disclosure contemplates that the steps of method 200 may be performed in any suitable order, according to particular needs.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system, comprising:

a plurality of security barriers attached to a structure such that the security barriers are operable to move from a first position in which the security barrier blocks an exterior opening of the structure to a second position in which the security barrier does not block the exterior opening of the structure, wherein each of the plurality of security barriers is associated with a location within the structure and the structure includes a plurality of locations;

a plurality of glass breaking mechanisms operable to clear glass from an exterior opening of the structure, wherein each of the plurality of glass breaking mechanisms is associated with one of the plurality of security barriers;

a plurality of latch mechanisms operable to control movement of the security barriers from the first position to the second position;

a plurality of sensors operable to generate an emergency signal indicating an emergency condition within the structure, wherein each of the plurality of sensors is associated with a location within the structure; and a control unit operable to:

detect that one of the plurality of sensors is non-communicative with the control unit;

determine the location within the structure of the non-communicative sensor; and generate, in response to detecting the non-communicative sensor, a release signal to be communicated to the latch mechanisms associated with the determined location of the non-communicative sensor;

the control unit further operable to:

access the emergency signal generated by one of the plurality of sensors;

determine the location within the structure of the emergency condition based on the emergency signal;

generate, in response to the emergency signal, the release signal to be communicated to the latch mechanisms of the security barriers associated with the location of the emergency condition;

activate, in response to the emergency signal, the glass breaking mechanisms associated with the security barriers associated with the determined location of the emergency condition; and activate, in response to the emergency signal, ventilation devices operable to remove harmful gas from the structure.

2. The system of claim 1, wherein:

the exterior opening to the structure is one of a door and a window; and the control unit is operable to deploy, in response to the emergency signal, one or more from the set comprising: ladders, ropes, and slides.

3. The system of claim 1, wherein:

the plurality of sensors comprise at least one of each of a smoke detector, a carbon monoxide detector, a radon detector, and a user activated switch.

4. The system of claim 1, wherein:

the plurality of sensors include a carbon monoxide detector; and the emergency condition comprises a carbon monoxide level within the structure that exceeds a value deemed safe for occupants of the structure.

5. The system of claim 1, wherein the security barrier is hingeably attached to the structure.

6. The system of claim 1, wherein the security barrier is slideably attached to the structure.

7. The system of claim 1, further comprising an exit indicator within the structure comprising a visual indicator and an audio indicator, the exit indicator operable to indicate to occupants of the structure the location of the exterior opening of the structure after the latch mechanism of the security barrier has been released.

8. The system of claim 1, further comprising a backup power supply operable to:

detect a failure of a primary power supply; and provide, in response to detecting the failure of the primary power supply, electrical power from a generator to the latch mechanism, the control unit, and the sensor, wherein the latch mechanism of the security barrier is released if the latch does not receive power.

9. A method, comprising:

attaching a plurality of security barriers to a structure, each security barrier being attached to the structure such the security barrier is operable to move from a first position in which the security barrier blocks an exterior opening to a second position in which the security barrier does not block the exterior opening of the structure, wherein each of the plurality of security barriers is associated with a location within the structure and the structure includes a plurality of locations;

attaching to the structure a plurality of glass breaking mechanisms operable to clear glass from an exterior opening of the structure, wherein each of the plurality of glass breaking mechanisms is associated with one of the plurality of security barriers;

attaching a plurality of latch mechanisms to the exterior of a structure, the latch mechanism operable to control movement of the security barrier from the first position to the second position;

configuring a control unit to communicate with the plurality of latch mechanisms and a plurality of sensors positioned within the structure, wherein each of the plurality of sensors is associated with a location within the structure, the control unit operable to:

detect that one of the plurality of sensors is non-communicative with the control unit;

determine the location within the structure of the non-communicative sensor; and generate, in response to detecting the non-communicative sensor, a release signal to be communicated to the latch mechanisms associated with the determined location of the non-communicative sensor;

the control unit further operable to:

access an emergency signal generated by one of the plurality of sensors;

determine the location within the structure of the emergency condition based on the emergency signal;

generate, in response to the emergency signal, the release signal to be communicated to the latch mechanisms of the security barriers associated with the location of the emergency condition;

activate, in response to the emergency signal, the glass breaking mechanisms associated with the security barriers associated with the determined location of the emergency condition; and activate, in response to the emergency signal, ventilation devices operable to remove harmful gas from the structure.

10. The method of claim 9, wherein:

the exterior opening to the structure is one of a door and a window; and the control unit is operable to deploy, in response to the emergency signal, one or more from the set comprising: ladders, ropes, and slides.

11. The method of claim 9, wherein:

the plurality of sensors comprise a plurality of sensors comprising at least one of each of a smoke detector, a carbon monoxide detector, a radon detector, and a user activated switch.

12. The method of claim 9, wherein:

the plurality of sensors include a carbon monoxide detector; and the emergency condition comprises a carbon monoxide level within the structure that exceeds a value deemed safe for occupants of the structure.

13. The method of claim 9, wherein the security barrier is hingeably attached to the exterior of the structure.

14. The method of claim 9, wherein the security barrier is slidably attached to the exterior of the structure.

15. The method of claim 9, further comprising installing an exit indicator within the structure comprising a visual indicator and an audio indicator, the exit indicator operable to indicate to occupants of the structure the location of the exterior opening of the structure after the latch mechanism of the security barrier has been released.

16. The method of claim 9, further comprising electrically connecting one or more of the latch mechanism, the control unit, and the sensor, to a backup power supply, the backup power supply operable to:

detect a failure of a primary power supply; and provide, in response to detecting the failure of the primary power supply, electrical power from a generator to the latch mechanism, the control unit, and the sensor, wherein the latch mechanism of the security barrier is released if the latch does not receive power.

17. A system, comprising:

a plurality of security barriers attached to a structure such that the security barriers are operable to slide from a first position in which the security barrier blocks a window of the structure to a second position in which the security barrier does not block the window of the structure, wherein each of the plurality of security barriers is associated with a location within the structure and the structure includes a plurality of locations;

a plurality of glass breaking mechanisms operable to clear glass from an exterior opening of the structure, wherein each of the plurality of glass breaking mechanisms is associated with one of the plurality of security barriers;

a plurality of latch mechanisms operable to control the sliding of the security barriers from the first position to the second position;

a plurality of sensors operable to generate an emergency signal indicating a fire within the structure, wherein each of the plurality of sensors is associated with a location within the structure;

one or more exit apparatuses operable to assist occupants exiting the structure through the window, wherein the one or more exit apparatuses are from the set comprising ladders, ropes, and slides; and a control unit operable to:

detect that one of the plurality of sensors is non-communicative with the control unit;

determine the location within the structure of the non-communicative sensor; and generate, in response to detecting the non-communicative sensor, a release signal to be communicated to the latch mechanisms associated with the determined location of the non-communicative sensor;

the control unit further operable to:

access the emergency signal generated by one of the plurality of sensors;

determine the location within the structure of the emergency condition based on the emergency signal;

generate, in response to the emergency signal, the release signal to be communicated to the latch mechanisms of the security barriers associated with the location of the emergency condition;

deploy, in response to the emergency signal, the one or more exit apparatuses;

activate, in response to the emergency signal, the glass breaking mechanisms associated with the security barriers associated with the determined location of the emergency condition; and activate, in response to the emergency signal, ventilation devices operable to remove harmful gas from the structure.

18. The system of claim 17, further comprising an exit indicator within the structure comprising a visual indicator and an audio indicator, the exit indicator operable to indicate to occupants of the structure the location of the exterior opening of the structure after the latch mechanism of the security barrier has been released.

19. The system of claim 17, further comprising a backup power supply operable to:

detect a failure of a primary power supply; and provide, in response to detecting the failure of the primary power supply, electrical power from a generator to the latch mechanism, the control unit, and the sensor, wherein the latch mechanism of the security barrier is released if the latch does not receive power.

* * * * *